(12) United States Patent
Urmanov et al.

(10) Patent No.: US 9,164,822 B2
(45) Date of Patent: Oct. 20, 2015

(54) METHOD AND SYSTEM FOR KEY PERFORMANCE INDICATORS ELICITATION WITH INCREMENTAL DATA DECYCLING FOR DATABASE MANAGEMENT SYSTEM

(71) Applicant: Oracle America, Inc., Redwood Shores, CA (US)

(72) Inventors: Aleksey M. Urmanov, San Diego, CA (US); Jonathan D. Klein, Redwood Shores, CA (US); Anton A. Bougaev, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 249 days.

(21) Appl. No.: 13/796,536

(22) Filed: Mar. 12, 2013

(65) Prior Publication Data

US 2014/0281738 A1    Sep. 18, 2014

(51) Int. Cl.
   *G06F 11/00* (2006.01)
   *G06F 11/07* (2006.01)
   *G06F 11/30* (2006.01)
(52) U.S. Cl.
   CPC ........ *G06F 11/0709* (2013.01); *G06F 11/0754* (2013.01); *G06F 11/30* (2013.01)
(58) Field of Classification Search
   CPC ................... G06F 11/3452; G06F 11/3409
   See application file for complete search history.

(56) References Cited

U.S. PATENT DOCUMENTS

| | | | |
|---|---|---|---|
| 6,622,221 B1 * | 9/2003 | Zahavi | 711/154 |
| 8,015,454 B1 * | 9/2011 | Harrison et al. | 714/47.3 |
| 2006/0136370 A1 * | 6/2006 | Buckler | 707/2 |
| 2008/0033991 A1 * | 2/2008 | Basak et al. | 707/104.1 |
| 2008/0126354 A1 * | 5/2008 | Wang et al. | 707/10 |
| 2009/0037367 A1 * | 2/2009 | Wein | 707/2 |
| 2011/0055388 A1 * | 3/2011 | Yumerefendi et al. | 709/224 |
| 2012/0233477 A1 * | 9/2012 | Wu et al. | 713/320 |

OTHER PUBLICATIONS

N. E. Huang et al., "The empirical mode decomposition and the Hilbert spectrum for nonlinear and non stationary time series analysis," Proc. Royal Soc. London A, vol. 454, pp. 903-995, 1998 (97 pages).

Spence, G.; Clarke, I.; , "A time domain analysis of multiple periodic signals," Timescale and Time Frequency Analysis and Applications (Ref. No. 2000/019), IEE Seminar on , vol., No., pp. 2/1-2/10, 2000 (10 pages).

(Continued)

*Primary Examiner* — Yolanda L Wilson
(74) *Attorney, Agent, or Firm* — Osha Liang LLP (57) ABSTRACT

A method for processing signals from a data server system including generating, by a monitoring module on a monitoring facility, a plurality of frequency data items, where the monitoring facility comprises a central processing unit, obtaining, by the monitoring module, a first signal value from the data server system, where the signal value is a measurement of an element of the data server system, and calculating a plurality of fit errors for the plurality of frequency data items using the first signal value. The method further includes selecting a frequency data item of the plurality of frequency data items with a lowest fit error to obtain a selected frequency data item, removing a cyclic component of the first signal value using the selected frequency data item to obtain a first processed signal value, and displaying the first processed signal value on a graph.

17 Claims, 8 Drawing Sheets

(56) References Cited

OTHER PUBLICATIONS

Geckinli, N.; Yavuz, D.; , "Algorithm for pitch extraction using zero crossing interval sequence," Acoustics, Speech and Signal Processing, IEEE Transactions on , vol. ASSP-25, No. 6, pp. 559-564, Dec. 1977 (6 pages).

Sacchi, M.D.; Ulrych, T.J.; Walker, C.J.; , "Interpolation and extrapolation using a high resolution discrete Fourier transform," Signal Processing, IEEE Transactions on , vol. 46, No. 1, pp. 31-38, Jan. 1998 (8 pages).

Franses, P. H., Paap, R. "Forecasting with Periodic Autoregressive TimeSeries Models ," in a Companion to Economic Forecasting, Blackwell Publishing Ltd , pp. 432-452, 2007 (27 pages).

Akaike, Hirotugu, "A new look at the statistical model identification". Automatic Control, IEEE Transactions on, vol. AC-19, No. 6, pp. 716-723, Dec. 1974 (8 pages).

\* cited by examiner

METHOD AND SYSTEM FOR KEY PERFORMANCE INDICATORS ELICITATION WITH INCREMENTAL DATA DECYCLING FOR DATABASE MANAGEMENT SYSTEM

BACKGROUND

Modern computer service providers rely on data servers and other complex computer systems to provide a variety of essential functions. These systems must be constantly monitored for abnormal behavior that can quickly escalate into major system issues. However, many of these systems are monitored for a large number of various metrics. Detecting abnormalities in such large streams of data can be onerous. Further, once an abnormality is discovered, a system administrator may have very little time to decide how to handle the abnormality.

SUMMARY

In general, in one aspect, the invention relates to a method for processing signals from a data server system. The method includes generating, by a monitoring module on a monitoring facility, a plurality of frequency data items, where the monitoring facility comprises a central processing unit, obtaining, by the monitoring module, a first signal value from the data server system, where the signal value is a measurement of an element of the data server system, and calculating a plurality of fit errors for the plurality of frequency data items using the first signal value. The method further includes selecting a frequency data item of the plurality of frequency data items with a lowest fit error to obtain a selected frequency data item, removing a cyclic component of the first signal value using the selected frequency data item to obtain a first processed signal value, and displaying the first processed signal value on a graph.

In general, in one aspect, the invention relates to a non-transitory computer readable medium that, when executed by a processor, performs a method for processing signals from a data server system. The method includes generating, by a monitoring module on a monitoring facility, a plurality of frequency data items, where the monitoring facility comprises a central processing unit, obtaining, by the monitoring module, a first signal value from the data server system, where the signal value is a measurement of an element of the data server system, and calculating a plurality of fit errors for the plurality of frequency data items using the first signal value. The method further includes selecting a frequency data item of the plurality of frequency data items with a lowest fit error to obtain a selected frequency data item, removing a cyclic component of the first signal value using the selected frequency data item to obtain a first processed signal value, and displaying the first processed signal value on a graph.

In general, in one aspect, the invention relates to a system including a central processing unit, a frequency repository, and monitoring module. The frequency repository includes a plurality of frequency data items. The monitoring module is configured to obtain a first signal value from the data server system, where the signal value is a measurement of an element of the data server system, calculate a plurality of fit errors for the plurality of frequency data items using the first signal value, and select a frequency data item of the plurality of frequency data items with a lowest fit error to obtain a selected frequency data item. The monitoring module is further configured to remove a cyclic component of the first signal value using the selected frequency data item to obtain a first processed signal value, and display the first processed signal value on a graph.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for monitoring database (DB) parameters. Specifically, embodiments of the invention may be used to incrementally decycle data streams to obtain information about a DB system. Further, embodiments of the invention may be used to elicit key performance indicators for monitoring and detecting changes in DB management systems.

In a DB, as in any complex system, there is a class of diagnostic variables that exhibit cyclical behavior. This cyclical behavior reflects the normal and expected pattern of operation of the system and its components. However, the cyclic pattern is not known or predetermined and may be obstructed by noise and other noncyclic patterns, and is not deterministic. This obstructed cyclical pattern may change in multiple aspects over time and with observed and unobserved factors (e.g., workload variations, operating algorithmic regimes of software components, etc.). The cyclical patterns and the presence or absence of other noncyclic patterns in the monitored data streams evolve, and this evolution of the patterns is important to eliciting the key performance indicators used to monitor the health of DB management systems.

Embodiments of the invention generate decycled data streams by detecting cyclical patterns of arbitrary form, identifying their features, tracking their evolution during system operation, and removing the cyclical component(s) from the incoming data streams. The features of the cyclical component and the decycled data signals are then used to elicit performance indicators of the current state and health of the monitored system, and may further be used to optimize system performance and detect incipient and ongoing service degradations.

Figure 1:
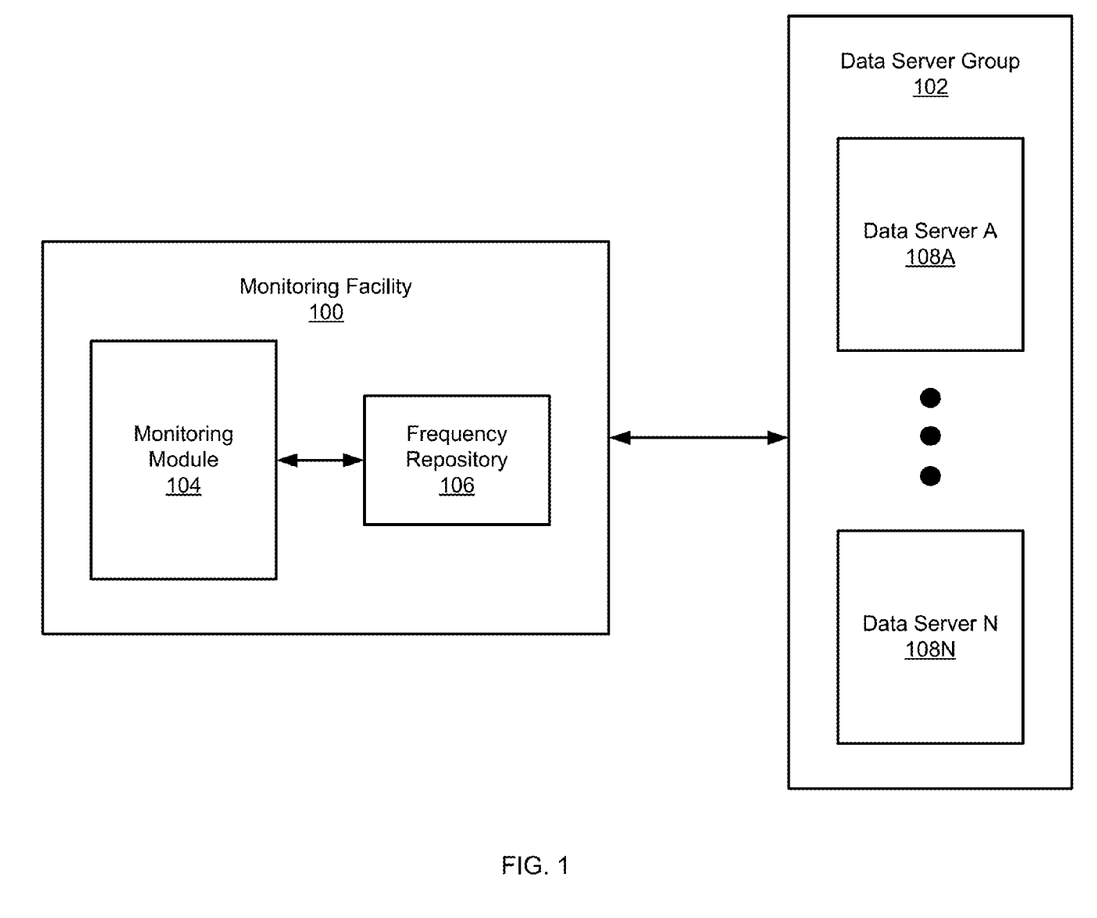
FIG. 1 shows a system in accordance with one or more embodiments of the invention.

FIG. 1 shows a diagram of a system in accordance with one or more embodiments of the invention. As shown in FIG. 1, a monitoring facility (100) is communicatively connected to a data server group (102) (data server A (108A), data server N (108N)). The monitoring facility (100) includes a monitoring module (104) and a frequency repository (106). The data server group (108) includes multiple data servers (data server A (108A), data server N (108N)).

In one or more embodiments of the invention, the monitoring facility (100) is a computer system or group of computer systems configured to monitor one or more data servers (data server A (108A), data server N (108N)) in a data server group (102). In one or more embodiments of the invention, the monitoring facility (100) may be implemented as part of a computer system or group of computer systems configured to manage a set of computer systems, such as within an enterprise network.

In one or more embodiments of the invention, the monitoring facility (100) is configured to deploy data gathering software processes (referred to as probes) on one or more data servers (data server A (108A), data server N (108N)). Such probes may be deployed to measure one or more data server elements on the data server (data server A (108A), data server N (108N)). As used herein, the term data server element refers to a measurable hardware or software component of a data server (data server A (108A), data server N (108N)). Such measurable components include, but are not limited to, a central processing unit (CPU), memory, storage, network stack, and operating system kernel.

In one embodiment of the invention, a probe measures one or more aspects related to a data server element. In one embodiment of the invention, a signal is a set of measurements of a data server element obtained by a probe and relayed back to the monitoring facility (100). In one embodiment of the invention, a signal is a measurement of time (e.g., the amount of time a task takes to execute), a measurement of usage (e.g., percentage of memory used), or a measurement of an amount (e.g., number of tasks waiting to execute). Other types of signals may be used without departing from the invention. Specific examples of such signals include, but are not limited to, percent of archive area used, average file read/write time, broken job count, percent of lock limit usage, service CPU time per user call, service response time per user call, deferred transaction count, dump area used, percent of buffer cache hit, CPU usage per second, CPU usage per transaction, percent of cursor cache hit, data dictionary hit, percent of database CPU time, global cache average convert time, percent of standard query language (SQL) response time, percent of Java™ pool free, percent of hypertext transfer protocol (HTTP) 200 s responses, requested handling time for a module, requested handling throughput for a module, active http connections, response data throughput, database management system job processing time, database management system job uptime, job dispatcher job step average backlog, job dispatcher processing time, rows per hour of the loader throughput, notification processing time, number of roles, percent of CPU consumption, number files open, number threads created, percent of resident memory utilization, virtual memory utilization, and virtual memory utilization growth.

In one embodiment of the invention, the monitoring module (104) is a process or group of processes configured to obtain a set of signal values from the one or more data servers (data server A (108A), data server N (108N)). The monitoring module (104) may further be configured to determine that the signal values obtained are cyclical in nature, calculate an equation for the cyclical elements of the signal values, and remove (i.e., decycle) the cyclical elements from the signal values.

In one or more embodiments of the invention, y(t) denotes one of the signals and $y\_i = y(t\_i)$ denotes sampled values of a signal at sample times $t\_i = 1, 2$, etc. The monitoring module (104) may use the following equation to determine the cyclical component of the metric signal $y\_i$:

$$y\_i = c + a \cdot \cos(2 \cdot \pi \cdot f \cdot t\_i + h) + \text{noise}\_i \quad (EQ1)$$

The cyclic trend in the form (EQ1) is next converted into a form suitable for an incremental fitting procedure to estimate the cycle characteristics of interest: mean (c), amplitude (a), frequency (f), and phase (h).

$$y\_i = c + a \cdot (\cos(2 \cdot \pi \cdot f \cdot t\_i) \cdot \cos(h) - \sin(2 \cdot \pi \cdot f \cdot t\_i) \cdot \sin(h)) + \text{noise}\_i$$

$$y\_i = c + a \cdot \cos(2 \cdot \pi \cdot f \cdot t\_i) \cdot \cos(h) - a \cdot \sin(2 \cdot \pi \cdot f \cdot t\_i) \cdot \sin(h) + \text{noise}\_i$$

A parameter vector (b) is generated using the following equations:

$$b[1] = c \quad (EQ2)$$

$$b[2] = a \cdot \cos(h) \quad (EQ3)$$

$$b[3] = -a \cdot \sin(h) \quad (EQ4)$$

Variables x1 and x2 are thus calculated as follows:

$$x1\_i = \cos(2 \cdot \pi \cdot f \cdot t\_i) \quad (EQ5)$$

$$x2\_i = \sin(2 \cdot \pi \cdot f \cdot t\_i) \quad (EQ6)$$

Then the amplitude (a) and phase (h) in terms of the parameter vector (b) are expressed as:

$$a = \sqrt{(b[2])^2 + (b[3])^2} \quad (EQ7)$$

$$h = \arccos(b[2]/a) \quad (EQ8)$$

Equation (EQ1) takes the following form:

$$y\_i = b[1] + b[2] \cdot x1\_i + b[3] \cdot x2\_i + \text{noise}\_i \quad (EQ9)$$

In one or more embodiments of the invention, the monitoring module also determines a normal system behavior. In one embodiment of the invention, normal system behavior is a model against which current or historic system behavior (e.g., incoming signals) is compared. Based on the comparison to the normal system behavior, the current system behavior or historic system behavior may be determined as within the expected bounds (i.e., consistent with normal system behavior) or outside the expected bounds (i.e., inconsistent with normal system behavior). Normal system behavior may be determined on a per-signal basis, or may be determined based on a combination of signals.

In one or more embodiments of the invention, the data servers (data server A (108A), data server N (108N)) are computer systems or groups of computer systems configured to provide data and or applications to connected clients (not shown). In one embodiment of the invention, the data servers (data server A (108A), data server N (108N)) include multiple data server elements which are monitored by probes. In one or more embodiments of the invention, the data servers (data server A (108A), data server N (108N)) may be implemented as database servers hosting databases.

In one or more embodiments of the invention, the monitoring facility (100) is connected to the data servers (data server A (108A), data server N (108N)) via a connection. The connection may be a network connection (e.g., a local area network (LAN), the Internet, etc.), a direct connection, or any combination thereof.

Figure 2:
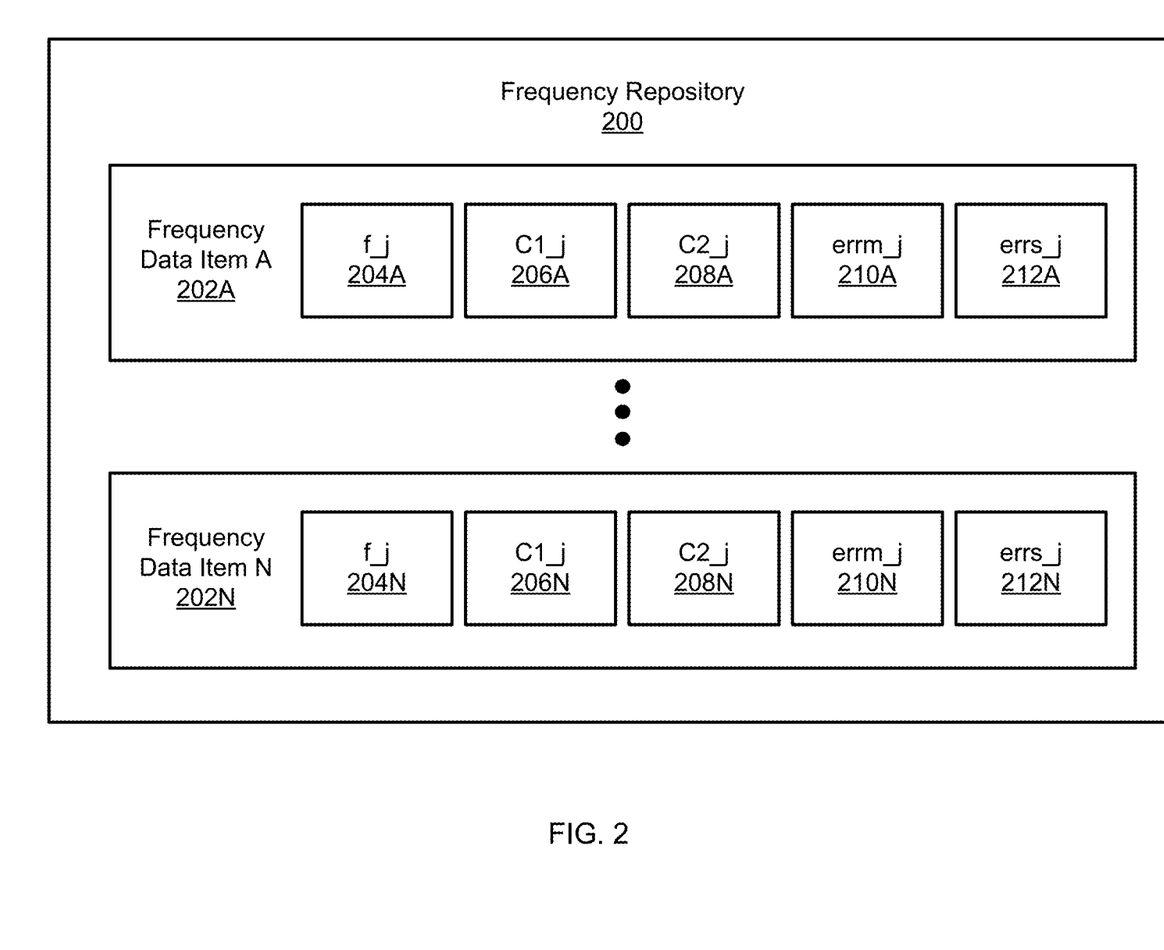
FIG. 2 shows a system in accordance with one or more embodiments of the invention.

FIG. 2 shows a frequency repository in accordance with one or more embodiments of the invention. As shown in FIG. 2, the frequency repository (200) includes multiple frequency data items (frequency data item A (202A), frequency data item N (202N)). Each frequency data item (frequency data item A (202A), frequency data item N (202N)) includes a frequency (f_j (204A), f_j (204N)), a first incremental update matrix (C1_j (206A), C1_j (206N)), a second incremental update matrix (C2_j (208A), C2_j (208N)), a mean error (errm_j (210A), errm_j (210N)), and a square error (errs_j (212A), errs_j (212N)).

In one or more embodiments of the invention, the frequency (f_j (204A), f_j (204N)) of each frequency data item corresponds to a period of cycles expressed in the number of received samples (j). For example, the frequencies (f_j (204A), f_j (204N)) stored in the frequency repository (200) each correspond to a period of one sample, two samples, three samples, etc.

$$f\_j = 1/j, j = 1, \ldots, n \quad (EQ10)$$

In one or more embodiments of the invention, the first incremental update matrix (C1_j (206A), C1_j (206N)) and the second incremental update matrix (C2_j (208A), C2_j (208N)) are values maintained for each frequency (f_j (204A), f_j (204N)) that store an aggregation of calculations for previously received signal values. In one or more embodiments of the invention, the mean error (errm_j (210A), errm_j (210N)) and the square error (errs_j (212A), errs_j (212N)) are values maintained for each frequency (f_j (204A), f_j (204N)) that store error calculations for the group of previously received signal values.

Figure 3:
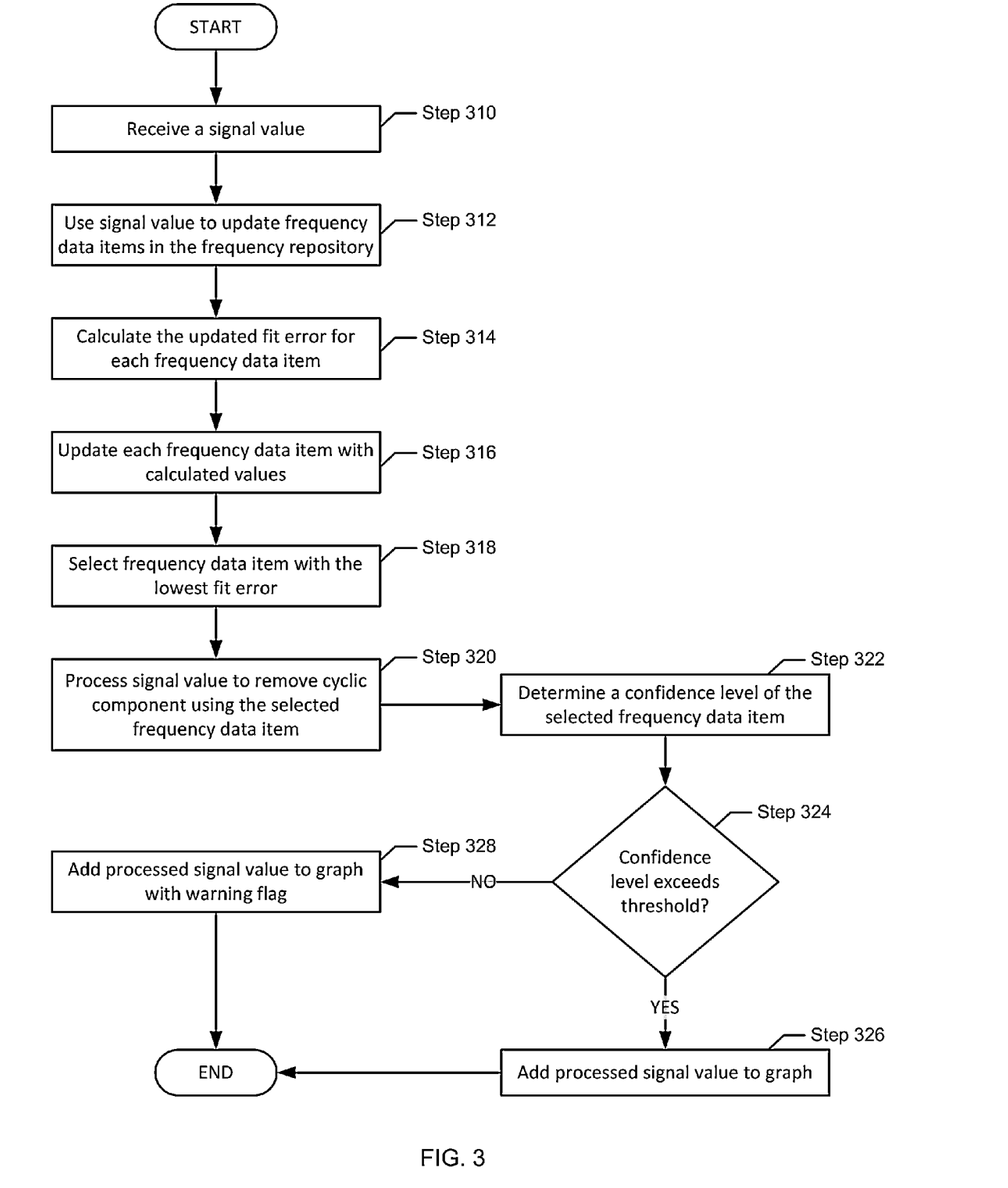
FIG. 3 shows a flow diagram in accordance with one or more embodiments of the invention.

FIG. 3 shows a flowchart for decycling a signal in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

In Step 310, the monitoring module receives a signal value. In one embodiment of the invention, the signal value is denoted as y_i at time t_i. In Step 312, the monitoring module updates the frequency data items in the frequency repository. In one embodiment of the invention, each frequency data item is updated by computing the values of the parameter vector (b), x1, and x2. As discussed above, x1 and x2 are calculated as follows:

$$x1 = \cos(2 \cdot \pi \cdot f\_j \cdot t\_i) \quad (EQ11)$$

$$x2 = \sin(2 \cdot \pi \cdot f\_j \cdot t\_i) \quad (EQ12)$$

In one embodiment of the invention, the parameter vector is updated using data from the most recently received signal values. The period of time over which the most recent values have been received by the monitoring module is referred to as the window size, and is denoted K. The parameter vector is updated using either the window size (K) or the total time period (i) over which values have been received if the signal been monitored for a period time less than K. The values in the first incremental update matrix (C1_j) are updated as follows:

$$C1\_j[1,1] = C1\_j[1,1] + 1/\min(K,i) \cdot (1 - C1\_j[1,1]) \quad (EQ13)$$

$$C1\_j[1,2] = C1\_j[1,2] + 1/\min(K,i) \cdot (x1 - C1\_j[1,2]) \quad (EQ14)$$

$$C1\_j[1,3] = C1\_j[1,3] + 1/\min(K,i) \cdot (x2 - C1\_j[1,3]) \quad (EQ15)$$

$$C1\_j[2,1] = C1\_j[2,1] + 1/\min(K,i) \cdot (x1 - C1\_j[2,1]) \quad (EQ16)$$

$$C1\_j[2,2] = C1\_j[2,2] + 1/\min(K,i) \cdot (x1 \cdot x1 - C1\_j[2,2]) \quad (EQ17)$$

$$C1\_j[2,3] = C1\_j[2,3] + 1/\min(K,i) \cdot (x1 \cdot x2 - C1\_j[2,3]) \quad (EQ18)$$

$$C1\_j[3,1] = C1\_j[3,1] + 1/\min(K,i) \cdot (x2 - C1\_j[3,1]) \quad (EQ19)$$

$$C1\_j[3,2] = C1\_j[3,2] + 1/\min(K,i) \cdot (x2 \cdot x1 - C1\_j[3,2]) \quad (EQ20)$$

$$C1\_j[3,3] = C1\_j[3,3] + 1/\min(K,i) \cdot (x2 \cdot x2 - C1\_j[3,3]) \quad (EQ21)$$

The values in the second incremental update matrix (C2_j) are updated using the received signal value (y_i) as follows:

$$C2\_j[1] = C2\_j[1] + 1/\min(K,i) \cdot (y\_i - C2\_j[1]) \quad (EQ22)$$

$$C2\_j[2] = C2\_j[2] + 1/\min(K,i) \cdot (x1 \cdot y\_i - C2\_j[2]) \quad (EQ23)$$

$$C2\_j[3] = C2\_j[3] + 1/\min(K,i) \cdot (x2 \cdot y\_i - C2\_j[3]) \quad (EQ24)$$

The values of the parameter vector (b_j) are updated using the incremental update matrixes as follows:

$$b\_j = \text{inv}(C1\_j + \lambda \cdot I(3)) \cdot C2\_j \quad (EQ25)$$

Where λ=0.001 (a small value to make the matrix inverse numerically stable), and where I(3) is a three-by-three identity matrix. (EQ26)

The cyclical component (yhat) for each frequency (f_j) is calculated using the parameter vector (b_j), x1, and x2 as follows:

$$yhat = b\_j[1] + b\_j[2] \cdot x1 + b\_j[3] \cdot x2 \quad (EQ27)$$

In Step 314, the monitoring module calculates the updated fit error for each frequency data item. In one embodiment of the invention, the fit error is calculated as the mean square error of the fit (er_j) of each frequency (f_j) using the following equations:

The error (e) is calculated as the difference between the signal value and the cyclical component:

$$e = y\_i - yhat \quad (EQ28)$$

The updated mean error (errmnew) is calculated using the mean error (errm_j), the error (e), and the window size (K) as follows:

$$errmnew = errm\_j + (e - errm\_j)/\min(K,i) \quad (EQ29)$$

The square error (errs_j) is updated as follows:

$$errs\_j = ((\min(K,i) - 1)/\min(K,i)) \cdot errs\_j + (e - errmnew) \cdot (e - errm\_j) \quad (EQ30)$$

The mean error (errm_j) is set to the updated mean error (errmnew):

$$errm\_j = errmnew \quad (EQ31)$$

The mean square error of the fit (er_j) is then calculated used the square error (errs_j) as follows:

$$er\_j = \sqrt{(errs\_j/\min(K,i))} \quad (EQ32)$$

In Step 316, each frequency data item is updated with the values calculated using the received signal value. In one embodiment of the invention, the monitoring module maintains the first incremental update matrix, the second incremental update matrix, the mean error (errm_j), and the square error (errs_j) for each frequency data item:

$$\{C1\_j \ C2\_j \ errm\_j \ errs\_j\} \quad (EQ33)$$

In Step 318, the monitoring module selects the frequency data item with the lowest calculated fit error. In one embodiment of the invention, the incrementally updated mean square error of the fit (er_j) is used to identify the frequency (f_j) corresponding to the minimum value of the mean square error (er_j).

In Step 320, the signal is processed to remove the cyclical component using the selected frequency data item. In one embodiment of the invention, using the arguments of the frequency data item with the minimum mean square error (er_j) value, the monitoring module generates running estimates (at time t_i) of the characteristics of the cyclical component, including the period of the cyclic component (phat), the amplitude of the cyclic component (ahat), the values of the mean of the decycled signal (chat), and the cyclic component itself (yhat).

The set of arguments (f_jhat, C1_jhat, and C2_jhat) of the frequency data item with the minimum mean square error (er_j) value are denoted jhat.

$$jhat = \arg\min er\_j \quad (EQ34)$$

Using the above equations and the arguments (f_jhat, C1_jhat, C2_jhat) of the frequency data item with the minimum mean square error (er_j) value, estimates for x1 and x2 are calculated as follows:

$$x1hat = \cos(2\cdot\pi\cdot f\_jhat\cdot t\_i)$$

$$x2hat = \sin(2\cdot\pi\cdot f\_jhat\cdot t\_i)$$

The estimated parameter vector (bhat) is calculated as:

$$b\_jhat = \text{inv}(C1\_jhat + \lambda\cdot I(3))\cdot C2\_jhat \quad (EQ35)$$

The estimated period (phat) is calculated as:

$$phat = 1/f\_jhat \quad (EQ36)$$

The estimated amplitude (ahat) is calculated as:

$$ahat = \sqrt{(b\_jhat[2]^2 + b\_jhat[3]^2)} \quad (EQ37)$$

The estimated mean of the decycled signal (chat) is calculated as:

$$chat = b\_jhat[1] \quad (EQ38)$$

The estimated cyclical component (yhat) is therefore calculated as:

$$yhat = b\_jhat[1] + b\_jhat[2]\cdot x1hat + b\_jhat[3]\cdot x2hat \quad (EQ39)$$

In one or more embodiments of the invention, a key performance indicator describes one or more aspects of the health of a data server system. Specifically, a key performance indicator of a given signal may provide information about the characteristics or status of the signal. For example, a key performance indicator may suggest a sudden change in the signal or a gradual upward or downward trend of a signal.

In one embodiment of the invention, key performance indicators may be elicited from the incrementally computed period, amplitude and mean of the decycled component. In one embodiment of the invention, the monitoring module maintains an internal data structure for each monitored signal to represent the current model (i.e., the most recently selected frequency data item) for the cyclical component in the signal.

In one or more embodiments of the invention, a monitoring module using the calculations described above is able to determine the existence and characteristics of the cyclical component of a signal without the use of a large buffer of signal data. Further, using the method described above, a frequency of the cyclical component of a signal may be determined without knowledge of the length of the period. The method described above may be used to instrument a monitoring module with the functionality to estimate the running amplitude of a cyclical pattern, its period, and the cyclical component, handle non-stationary data, perform in an incremental manner, track a changing period, indicate transient stages (such as initial stage and after a sudden change in the period), and manage the footprint of the required data structures.

In Step 322, the monitoring module determines a confidence level of the selected frequency data item. The confidence level may be determined based on a number of measurements and aspects of the selected frequency data item. In one embodiment of the invention, the number of samples available may not be sufficient to draw a reliable conclusion about the presence or absence of a cyclical component in the monitored signal. Similarly, after a sudden change of one or more characteristics of the cyclical component (e.g., doubling the period) the samples preceding and following the change and contributing to the current estimates may not be sufficient to draw a reliable conclusion that the specific characteristic of the cyclical component has changed. During such transient periods, the monitoring module raises a warning flag, indicating that the estimates are not reliable enough to draw conclusions and perform any actions.

In one embodiment of the invention, the confidence level is determined by computing the confidence intervals of the coefficients (b[1], b[2], b[3]) in the model of (EQ9), and keeping track of the value of the intervals. If any of the confidence intervals includes zero, the monitoring module raises the warning flag. A determination that all three confidence intervals do not include zeros indicates that the monitoring module has received enough samples to build a reliable model of the cyclical pattern that fits into the signal, and the warning flag is cleared.

In one embodiment of the invention, the following steps are performed to compute the confidence intervals of the period estimation:

$$sig = er \quad (EQ40)$$

where er corresponds to the minimal er_j from (EQ32).

$$alpha = 0.05 // 95\% \text{ significance level} \quad (EQ41)$$

The tinv is the inverse of the Student's t-distribution function. It returns tval, the (1−alpha)/2 percentile of the t-distribution for min(K,i)−3 degrees of freedom.

$$tval = tinv((1-alpha/2), \max(1, \min(K,i)-3)) \quad (EQ42)$$

The Covb is the covariance matrix for the estimate of the parameter vector (b).

$$Covb\_j = sig^2\cdot\text{inv}(C1\_j+\lambda\cdot I(3))\cdot C1\_j\cdot\text{inv}(C1\_j+\lambda\cdot I(3))/\min(K,i) \quad (EQ43)$$

The SEb is the standard error for the estimate of the parameter vector (b).

$$SEb\_j = \sqrt{(\text{diag}(Covb\_j))} \quad (EQ44)$$

The cihat is the confidence interval for the estimate of the parameter vector (b).

$$cihat\_j = tval\cdot SEb\_j \quad (EQ45)$$

Verification that none of the confidence intervals is zero may be determined using the following equation:

$$\text{if}(((b\_jhat[1]-cihat\_j[1])>0)\|(b\_jhat[1]+cihat\_j[1])<0))\&\&\ldots((b\_jhat[2]-cihat\_j[2])>0)\|(b\_jhat[2]+cihat\_j[2])<0))\&\&\ldots((b\_jhat[3]-cihat\_j[3])>0)\|(b\_jhat[3]+cihat\_j[3])<0)))$$
$$\text{then FidelityHigh=True} \quad (EQ46)$$

In one embodiment of the invention, a model selection criterion may be used to determine if a constant model fits the data locally better than a cyclical model. If the constant model (e.g., the model of (EQ1) with just one first term) is selected by the model selection criterion, then the confidence level that a cyclical component has been detected is lowered. If the cyclical model is selected over the constant model, then the confidence level rises. In one embodiment of the invention, an Akaike Information Criterion (AIC) is used to select the best-fit model from constant and cyclical models using the mean square error (MSE). The AIC may be computed as:

AIC(constant model)=MSE+2     (EQ47)

AIC(cyclic model)=MSE+2.3     (EQ48)

The model corresponding to the lowest value of the information complexity criterion is selected as the best-fit model.

In Step 324, a determination is made as to whether the confidence level exceeds a threshold. In one embodiment of the invention, the comparison between the confidence level and the threshold depends on the method of calculating the confidence level. In one embodiment of the invention, the threshold represents the minimum confidence level necessary to add a signal value to a graph without a warning flag. If in Step 324, the confidence level exceeds the threshold, then in Step 326, the processed signal value is added to a graph without a warning flag. If in Step 324, the confidence level does not exceed (or is equal to) the threshold, then in Step 328, the processed signal value is added to a graph with a warning flag.

In one embodiment of the invention, once a processed signal value or a set of processed signal values are added to a graph, the graph may then be used to extrapolate data regarding the health of a data server system. Specifically, the graph may be used to generate key performance indicators that describe the health of the data server system in regard to the monitored signal. One way in which the key performance indicators may be used to describe the health of a data server system is by indicating that a change in the signal has occurred. For example, two or more key performance indicators may be compared to determine whether a change has occurred.

In one or more embodiments of the invention, a change in the behavior of a signal may be detected using different methods. In one embodiment of the invention, the mean value of the decycled signal is monitored for changes using a sequential change detection method (e.g., a sequential probability ratio test (SPRT)). In one embodiment of the invention, the decycled signal is monitored for slowly developing upward and downward trends.

In one embodiment of the invention, the monitoring module includes functionality to determine (based on the key performance indicators) whether a change in a signal has occurred and to react to the perceived change. In order to quickly react to changes in the cyclical pattern characteristics, the monitoring module may use the most recent samples (e.g., widow size (K)) to compute the incremental updates to the estimated characteristics. In one embodiment of the invention, the window size is set in such a way as to include at least three or four cycles of the data. As the monitoring module processes the signal values to estimate the cyclical pattern to identify the current period of the cyclical pattern, the window size is adjusted to optimize the reaction time to changes in the characteristics of the cyclical pattern. The window size may further be adjusted to include enough samples to detect cyclical patterns with longer periods.

In one embodiment of the invention, certain characteristics of a decycled signal may trigger an alert. Specifically, certain characteristics of a decycled signal may indicate that a problem with the monitored data server system(s) exists or is expected to occur. In such cases, an alert may be generated and provided to a system administrator indicating the existing or expected problem. The alert may be, for example, a visual presentation on a display or a message transmitted to an electronic communication device of the system administrator.

In one or more embodiments of the invention, one or more responses to a problem may be automatically trigged upon the detection of the problem and/or an alert. Such responses may include instructing the data server system to take corrective action. For example, the decycled signal may indicate a trend toward exhaustion of a resource on a data server system. In response, the monitoring module may instruct the data server system to take steps to prevent the exhaustion of that resource.

Figure 4A:
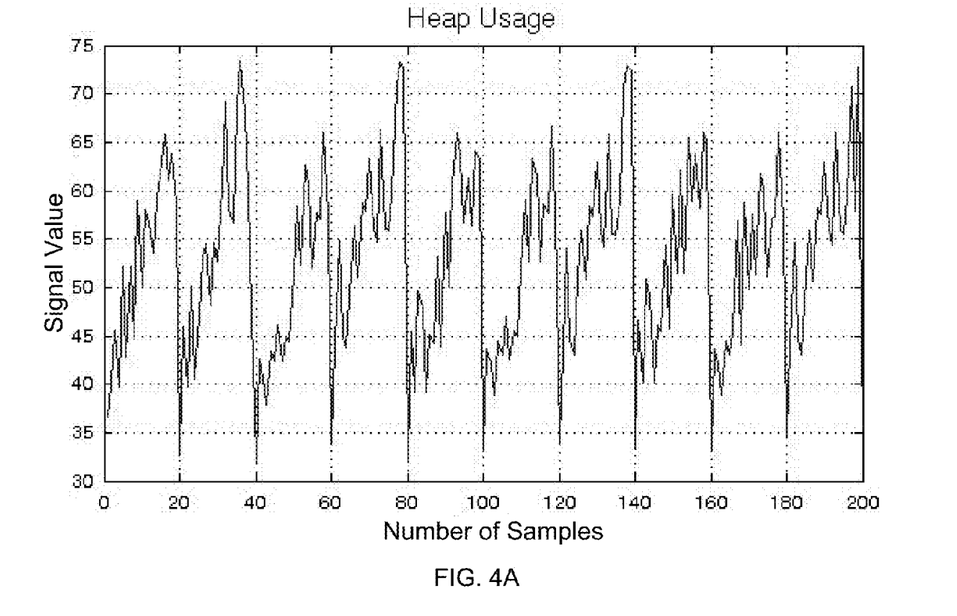
FIGS. 4A-4D show an example in accordance with one or more embodiments of the invention.

FIGS. 4A-4D show an example in accordance with one or more embodiments of the invention. FIG. 4A shows a graph of signal values received from a data server system indicating a software process's heap usage. The cyclical pattern shown is an intrinsic property of the operating process and is the consequence of normal, designed behavior. The process's cyclical behavior may not be optimal in terms of heap usage or other performance characteristics. However, the cyclical behavior represents the developer-designed behavior and/or the behavior determined by the executing environment.

Figure 4B:
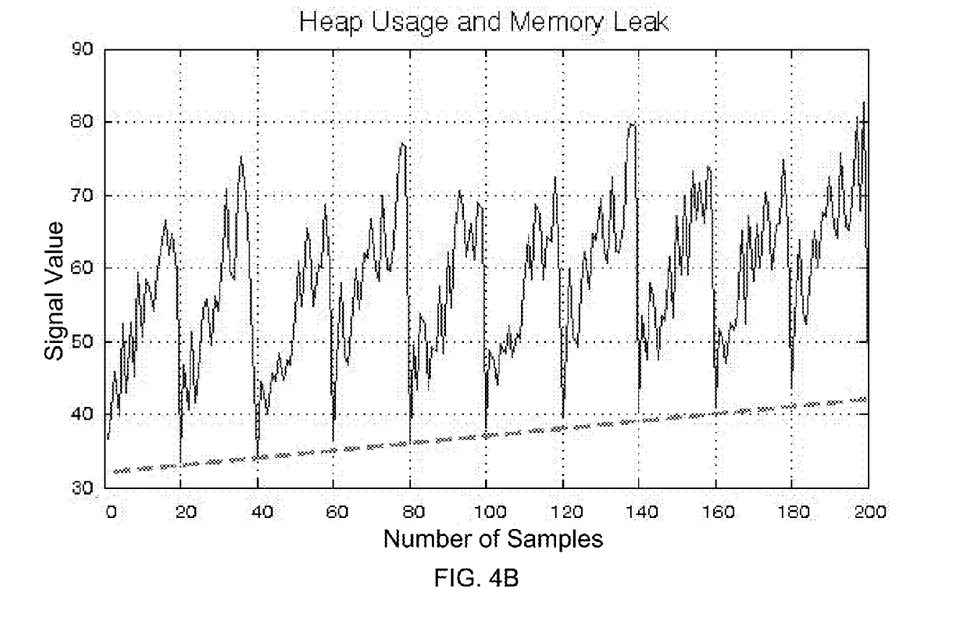

FIG. 4B shows heap usage on a data server system that is leaking memory. The graph shown in FIG. 4B displays a slowly developing upward trend, which may be completely hidden or obstructed by the normal cyclic pattern, short-term ramps, and random variations. Such a slowly evolving trend may be difficult to reliably detect at its incipient stage. However, if unnoticed, it can potentially lead to memory exhaustion failures. Embodiments of the invention may be used to determine the features of the cyclical pattern (such as the period and the delta of the crest or trough), based on the elicited key performance indicators.

Continuing with the example shown in FIG. 4B, as each signal value is received by the monitoring module, the monitoring module creates a new frequency data item with a frequency corresponding to the inverse of number of samples received (period). Specifically, when the first sample value is received, the monitoring module creates a frequency data item and stores "1" as the frequency value. When the tenth sample value is received, the monitoring module creates a frequency data item and stores "0.1" as the frequency value.

In addition to creating new frequency data items, as each signal value is received, all frequency data items stored in the frequency repository are updated using the new signal value. Specifically, the x1 and x2 values are calculated for each frequency using the time (t_i) the sample value is received, and the incremental update matrixes (C1_j, C2_j) are recalculated using the x1 and x2 values and the newly received signal value (y_i). Finally, the parameter vector (b) is calculated from the incremental update matrixes (C1_j, C2_j), and the cyclical component (yhat) is calculated from the parameter vector (b) and the x1 and x2 values.

Figure 4C:
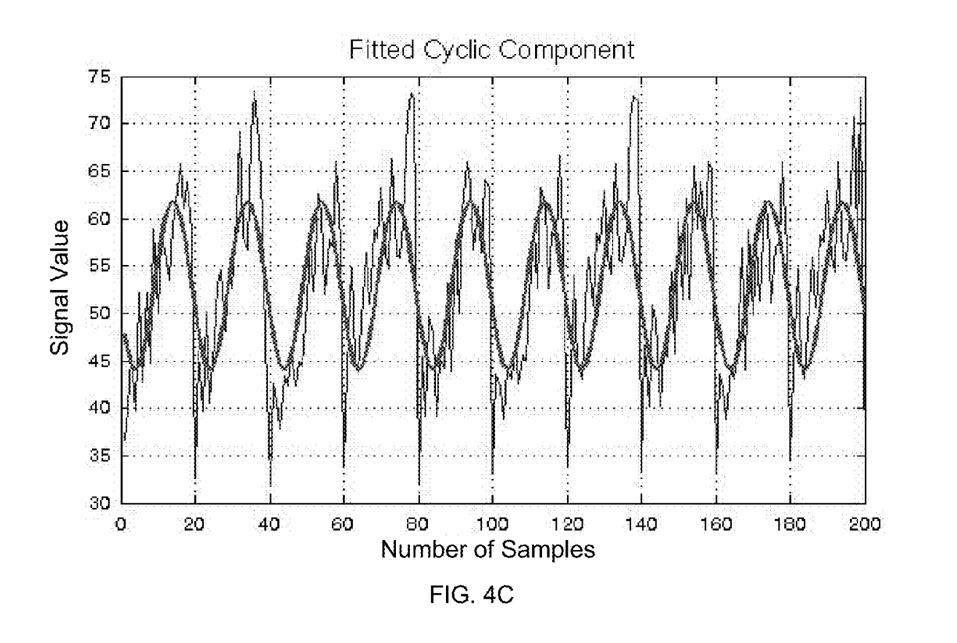

Once the cyclical component (yhat) for each frequency is determined, the fit error (er_j) for each frequency is updated, and the frequency data item with the lowest calculated fit error (er_j) is selected. FIG. 4C illustrates the heap usage signal overlaid with a cyclical component derived by selected the frequency data item with the lowest calculated fit error (er_j).

Figure 4D:
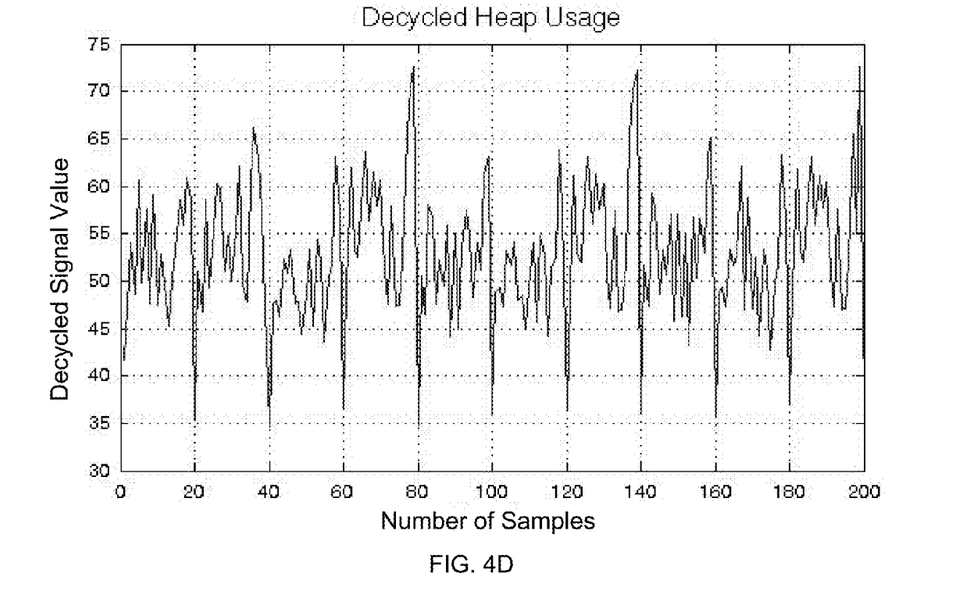

FIG. 4D shows the decycled heap usage signal. The values shown on the graph in FIG. 4D are the differences between the received value (y_i) and the cyclical component (yhat) calculated from the frequency data item with the lowest fit error (er_j). The non-cyclical data describing the heap usage is preserved and slowly evolving trends and sudden changes in the signal may be rapidly detected.

Figure 5A:
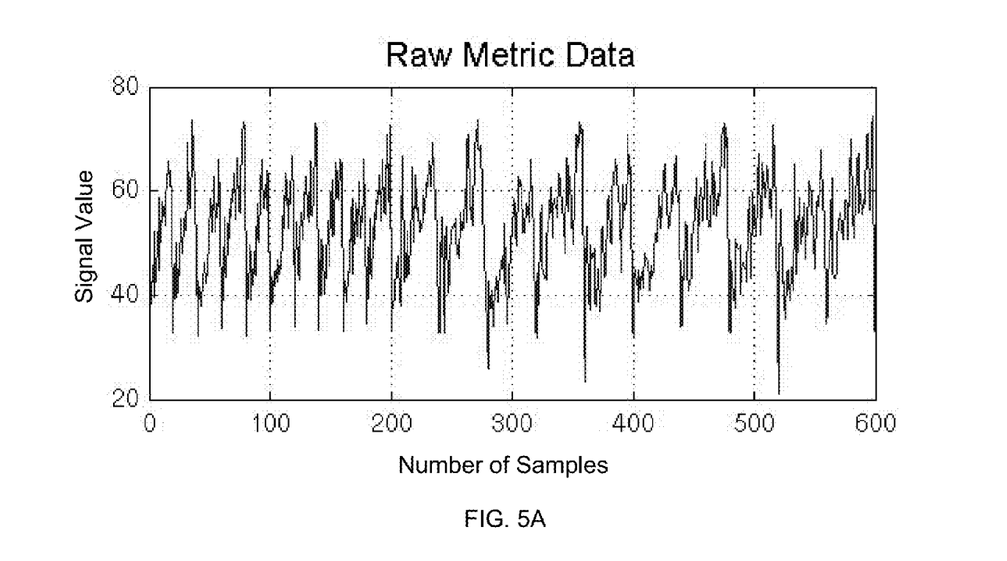
FIGS. 5A-5B show an example in accordance with one or more embodiments of the invention.
Figure 5B:
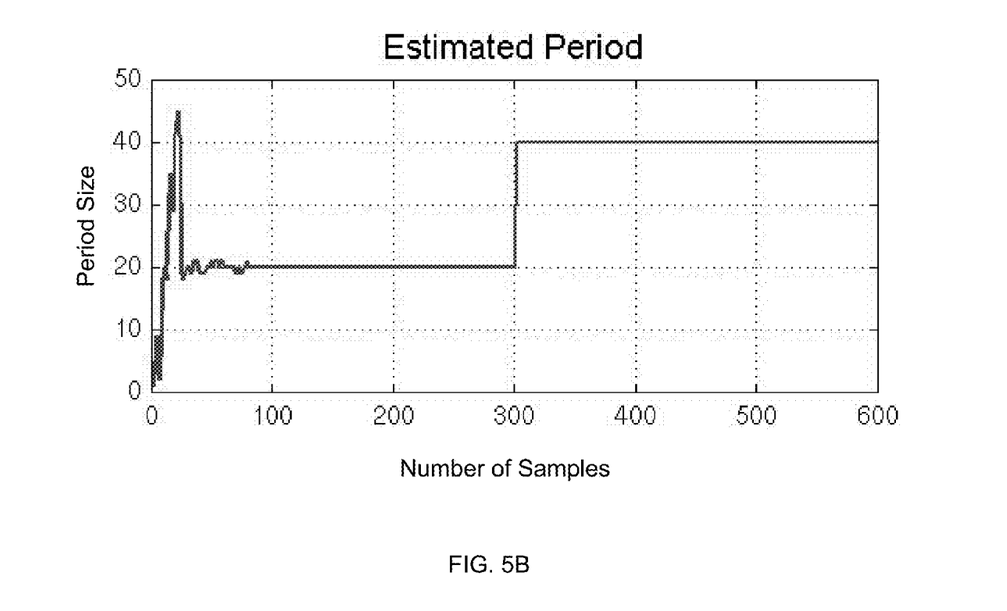

FIGS. 5A-5B show an example in accordance with one or more embodiments of the invention. FIG. 5A illustrates the operation of the monitoring module on a signal describing heap usage. FIG. 5B illustrates the estimated period during the same set of samples. During the initial phase, the monitoring module estimates the period of the cyclical component in the data by creating and updating the set of frequency data items, and selecting the frequency data item with the lowest fit error. During the initial period of time over which signal values are received, the fit error for each existing frequency data item is high, and an accurate determination of the frequency (and inversely, the period) does not exist.

At certain point (~80 samples) the period estimate becomes stable. At another point (~200 samples) a change has happened that causes a doubling of the period. It takes about two periods of data for the monitoring module to reliably estimate the new period after the change. The initial stage and changing stage are transient stages during which the sample evidence is not sufficient to draw reliable conclusions and, therefore, a warning flag is raised indicating the transient stages.

Figure 6A:
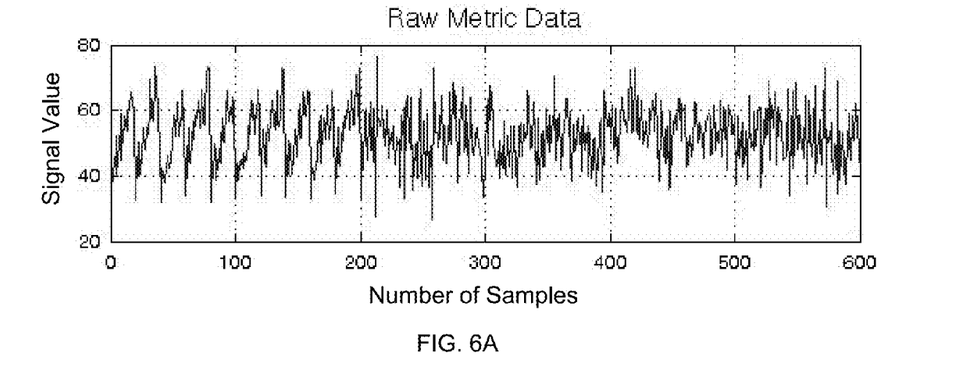
FIGS. 6A-6C show an example in accordance with one or more embodiments of the invention.
Figure 6B:
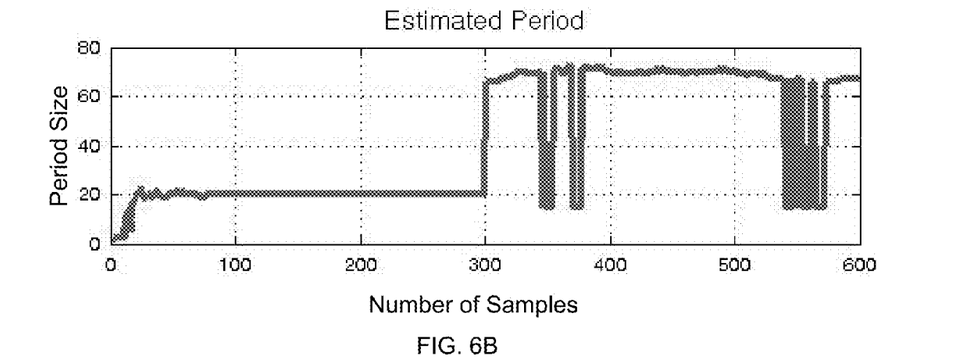
Figure 6C:
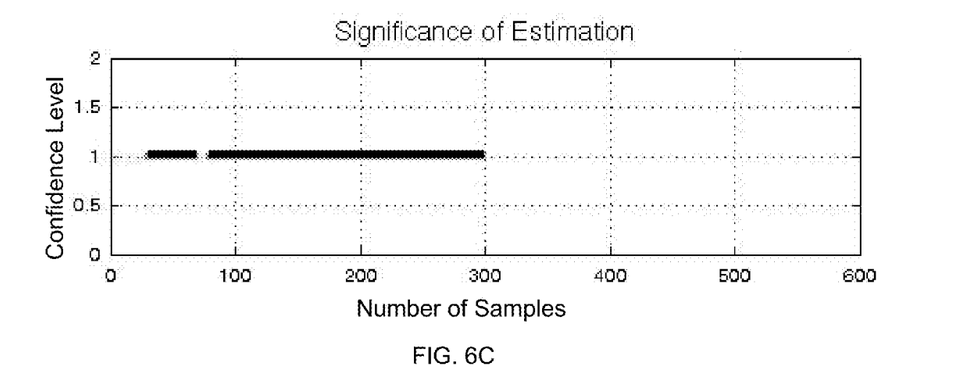

FIGS. 6A-6C show an example in accordance with one or more embodiments of the invention. FIG. 6A illustrates a set of signal values received from a data server system. FIG. 6B illustrates the period estimation by the monitoring module as the signal values are being received. FIG. 6C illustrates the confidence level of the period estimation as the signal values are being received. The lack of a line indicates that no cyclic component has been accurately determined. As illustrated, there is no cyclical component detected after ~300 samples indicating that the signal values are randomly generated values without any cyclical components.

Figure 7:
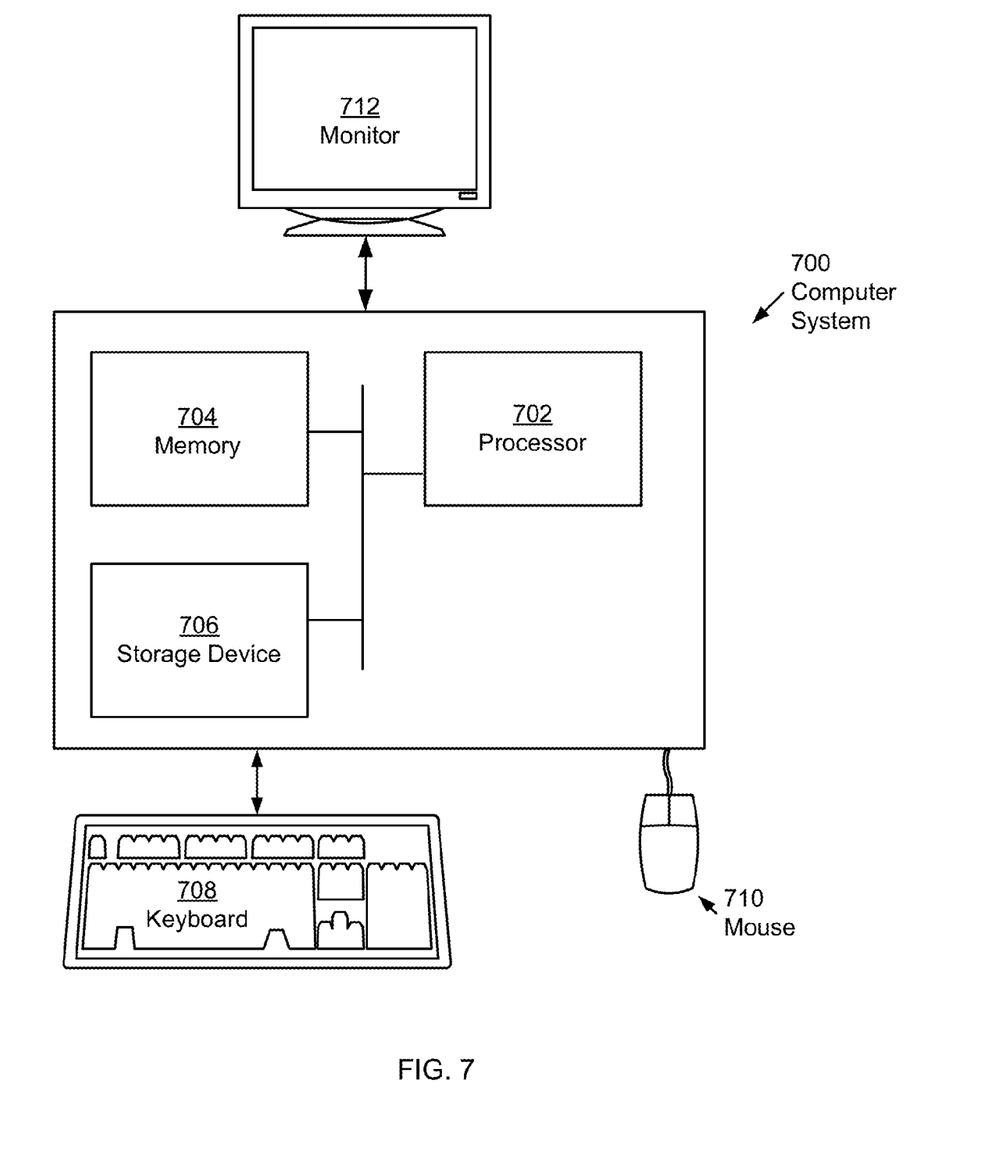
FIG. 7 shows a computer system in accordance with one or more embodiments of the invention.

Embodiments of the invention may be implemented on virtually any type of computer regardless of the platform being used. For example, as shown in FIG. 7, a computer system (700) includes one or more processor(s) (702) such as a central processing unit (CPU) or other hardware processor(s), associated memory (704) (e.g., random access memory (RAM), cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (702) is hardware. For example, the processor may be an integrated circuit. The computer system (700) may also include input means, such as a keyboard (708), a mouse (710), or a microphone (not shown). Further, the computer system (700) may include output means, such as a monitor (712) (e.g., a liquid crystal display (LCD), a plasma display, or cathode ray tube (CRT) monitor). The computer system (700) may be connected to a network (714) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, those skilled in the art will appreciate that one or more elements of the aforementioned computer system (700) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing signals from a data server system comprising:
    generating, by a monitoring module on a monitoring facility, a plurality of frequency data items,
        wherein the monitoring facility comprises a central processing unit, and
        wherein the plurality of frequency data items include a frequency, a first incremental update matrix, a second incremental update matrix, a mean error, and a square error;
    obtaining, by the monitoring module, a first signal value from the data server system, wherein the signal value is a measurement of an element of the data server system;
    calculating a plurality of fit errors for the plurality of frequency data items using the first signal value, wherein each of the plurality of fit errors is calculated as a mean square error of a fit of each frequency;
    selecting a frequency data item of the plurality of frequency data items with a lowest fit error to obtain a selected frequency data item;
    removing a cyclic component of the first signal value using the selected frequency data item to obtain a first processed signal value;
    detecting that the first processed signal value and a second processed signal value indicate a change in the element of the data server system; and
    displaying the first processed signal value on a graph.

2. The method of claim 1, wherein detecting that the first processed signal value and the second processed signal value indicate the change in the element of the data server system comprises:
    eliciting a first key performance indicator from the first processed signal value;
    eliciting a second key performance indicator from the second processed signal value; and
    comparing the first key performance indicator and the second key performance indicator.

3. The method of claim 1, further comprising:
    generating an alert based on the change in the element of the data server system.

4. The method of claim 1, further comprising:
    instructing the data server system to take corrective action based on the change in the element of the data server system.

5. The method of claim 1, further comprising:
    determining that a confidence level of the processed signal value does not exceed a threshold; and
    associating a warning flag with the processed signal value.

6. The method of claim 1, further comprising:
determining a confidence interval of a coefficient of the selected frequency data item; and
displaying a confidence level associated with the first processed signal value on the graph based on the confidence interval.

7. A non-transitory computer readable medium that, when executed by a processor, performs a method for processing signals from a data server system, the method comprising:
generating, by a monitoring module on a monitoring facility, a plurality of frequency data items,
wherein the monitoring facility comprises a central processing unit, and
wherein the plurality of frequency data items include a frequency, a first incremental update matrix, a second incremental update matrix, a mean error, and a square error;
obtaining, by the monitoring module, a first signal value from the data server system, wherein the signal value is a measurement of an element of the data server system;
calculating a plurality of fit errors for the plurality of frequency data items using the first signal value, wherein each of the plurality of fit errors is calculated as a mean square error of a fit of each frequency;
selecting a frequency data item of the plurality of frequency data items with a lowest fit error to obtain a selected frequency data item;
removing a cyclic component of the first signal value using the selected frequency data item to obtain a first processed signal value;
detecting that the first processed signal value and a second processed signal value indicate a change in the element of the data server system; and
displaying the first processed signal value on a graph.

8. The non-transitory computer readable medium of claim 7, wherein detecting that the first processed signal value and the second processed signal value indicate the change in the element of the data server system comprises:
eliciting a first key performance indicator from the first processed signal value;
eliciting a second key performance indicator from the second processed signal value; and
comparing the first key performance indicator and the second key performance indicator.

9. The non-transitory computer readable medium of claim 7, the method further comprising:
generating an alert based on the change in the element of the data server system.

10. The non-transitory computer readable medium of claim 7, the method further comprising:
instructing the data server system to take corrective action based on the change in the element of the data server system.

11. The non-transitory computer readable medium of claim 7, the method further comprising:
determining that a confidence level of the processed signal value does not exceed a threshold; and
associating a warning flag with the processed signal value.

12. The non-transitory computer readable medium of claim 7, the method further comprising:
determining a confidence interval of a coefficient of the selected frequency data item; and
displaying a confidence level associated with the first processed signal value on the graph based on the confidence interval.

13. A system comprising:
a central processing unit;
a frequency repository comprising a plurality of frequency data items, wherein the plurality of frequency data items include a frequency, a first incremental update matrix, a second incremental update matrix, a mean error, and a square error; and
a monitoring module configured to:
obtain a first signal value from the data server system, wherein the signal value is a measurement of an element of the data server system;
calculate a plurality of fit errors for the plurality of frequency data items using the first signal value, wherein each of the plurality of fit errors is calculated as a mean square error of a fit of each frequency;
select a frequency data item of the plurality of frequency data items with a lowest fit error to obtain a selected frequency data item;
remove a cyclic component of the first signal value using the selected frequency data item to obtain a first processed signal value;
detect that the first processed signal value and a second processed signal value indicate a change in the element of the data server system; and
display the first processed signal value on a graph.

14. The system of claim 13, wherein detecting that the first processed signal value and the second processed signal value indicate the change in the element of the data server system comprises:
eliciting a first key performance indicator from the first processed signal value;
eliciting a second key performance indicator from the second processed signal value; and
comparing the first key performance indicator and the second key performance indicator.

15. The system of claim 13, wherein the monitoring module is further configured to:
generate an alert based on the change in the element of the data server system.

16. The system of claim 13, wherein the monitoring module is further configured to:
instruct the data server system to take corrective action based on the change in the element of the data server system.

17. The system of claim 13, wherein the monitoring module is further configured to:
determine that a confidence level of the processed signal value does not exceed a threshold; and
associate a warning flag with the processed signal value.

* * * * *

UNITED STATES PATENT AND TRADEMARK OFFICE
CERTIFICATE OF CORRECTION

PATENT NO. : 9,164,822 B2  
APPLICATION NO. : 13/796536  
DATED : October 20, 2015  
INVENTOR(S) : Urmanov et al.

It is certified that error appears in the above-identified patent and that said Letters Patent is hereby corrected as shown below:

In the specification

Column 4, lines 20-21, delete "$y\_i=c+a\cdot\cos(2\cdot\pi\cdot f\cdot t\_i)\cdot\cos(h)-a\cdot\sin(2\cdot\pi\cdot f\cdot t\_i)\cdot\sin(h))+noise\_i$" and insert -- $y\_i = c + a\cdot\cos(2\cdot\pi\cdot f\cdot t\_i)\cdot\cos(h) - a\cdot\sin(2\cdot\pi\cdot f\cdot t\_i)\cdot\sin(h) + noise\_i$ --, therefor.

Column 4, line 58, delete "and or" and insert -- and/or --, therefor.

Column 6, line 44, delete "$errmnewerrm\_j+(e-errm\_j)/\min(K,i)$" and insert -- $errmnew = errm\_j + (e - errm\_j)/\min(K,i)$ --, therefor.

Signed and Sealed this  
Seventh Day of June, 2016

Michelle K. Lee  
*Director of the United States Patent and Trademark Office*